(12) United States Patent
Wang

(10) Patent No.: US 10,705,866 B2
(45) Date of Patent: *Jul. 7, 2020

(54) SYSTEM AND METHOD FOR EXECUTING DIFFERENT TYPES OF BLOCKCHAIN CONTRACTS

(71) Applicant: ALIBABA GROUP HOLDING LIMITED, Grand Cayman (KY)

(72) Inventor: Shifeng Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,016

(22) Filed: Dec. 16, 2019

(65) Prior Publication Data

US 2020/0117493 A1 Apr. 16, 2020

Related U.S. Application Data

(63) Continuation of application No. PCT/CN2019/093591, filed on Jun. 28, 2019.

(51) Int. Cl.
*G06F 9/455* (2018.01)
*G06F 8/30* (2018.01)

(52) U.S. Cl.
CPC ............ *G06F 9/45533* (2013.01); *G06F 8/30* (2013.01)

(58) Field of Classification Search
None
See application file for complete search history.

(56) References Cited

U.S. PATENT DOCUMENTS

| | | | |
|---|---|---|---|
| 9,942,250 B2 | 4/2018 | Stiansen et al. | |
| 9,967,334 B2 | 5/2018 | Ford | |
| 10,168,678 B2 | 1/2019 | Belveal et al. | |
| 10,192,073 B2 | 1/2019 | Marin | |
| 2004/0068726 A1* | 4/2004 | Levy | G06F 9/44589 718/1 |
| 2010/0058328 A1* | 3/2010 | DeHaan | G06F 8/61 717/176 |
| 2011/0176491 A1* | 7/2011 | Stafford | H04L 69/04 370/328 |

(Continued)

FOREIGN PATENT DOCUMENTS

| | | | |
|---|---|---|---|
| CN | 107833060 A | * | 3/2018 |
| CN | 107943469 A | | 4/2018 |

(Continued)

OTHER PUBLICATIONS

English Translation of CN107833060A (Year: 2018).*

(Continued)

*Primary Examiner* — Bradley A Teets

(57) ABSTRACT

Methods, systems, and apparatus, including computer programs encoded on computer storage media, for executing blockchain contracts are provided. One of the methods includes: obtaining a bytecode of a blockchain contract, wherein the bytecode comprises one or more indicators, and the one or more indicators comprise a first indicator indicating a virtual machine type for executing the blockchain contract; and executing the blockchain contract using a virtual machine of the virtual machine type associated with the first indicator.

20 Claims, 11 Drawing Sheets

(56) References Cited

U.S. PATENT DOCUMENTS

| | | | |
|---|---|---|---|
| 2014/0337836 A1* | 11/2014 | Ismael | G06F 21/56 |
| | | | 718/1 |
| 2016/0105350 A1* | 4/2016 | Greifeneder | H04L 41/046 |
| | | | 709/224 |
| 2016/0314005 A1* | 10/2016 | Greifeneder | G06F 9/45504 |
| 2017/0230285 A1 | 8/2017 | Crabtree et al. | |
| 2017/0243176 A1 | 8/2017 | Hanke et al. | |
| 2017/0345011 A1* | 11/2017 | Salami | G06Q 20/42 |
| 2017/0352012 A1 | 12/2017 | Hearn et al. | |
| 2017/0352027 A1 | 12/2017 | Zhang et al. | |
| 2017/0353309 A1* | 12/2017 | Gray | H04L 9/3236 |
| 2018/0005186 A1 | 1/2018 | Hunn | |
| 2018/0018723 A1* | 1/2018 | Nagla | G06Q 20/388 |
| 2018/0078843 A1* | 3/2018 | Tran | A61B 5/0024 |
| 2018/0174255 A1 | 6/2018 | Hunn et al. | |
| 2018/0219681 A1 | 8/2018 | Geiman et al. | |
| 2018/0365201 A1* | 12/2018 | Hunn | G06F 40/186 |
| 2019/0019183 A1* | 1/2019 | Karame | H04L 9/008 |
| 2019/0050831 A1 | 2/2019 | Kikinis | |
| 2019/0050855 A1 | 2/2019 | Martino et al. | |
| 2019/0058581 A1 | 2/2019 | Wood et al. | |
| 2019/0081793 A1 | 3/2019 | Martino et al. | |
| 2019/0102163 A1* | 4/2019 | Witherspoon | G06F 8/65 |
| 2019/0108576 A1* | 4/2019 | LaPrade | G06Q 30/0635 |
| 2019/0122317 A1* | 4/2019 | Hunn | G06Q 20/405 |
| 2019/0140935 A1 | 5/2019 | Kikinis | |
| 2019/0147190 A1* | 5/2019 | Marin | G06F 21/31 |
| | | | 713/189 |
| 2019/0147440 A1 | 5/2019 | Deliwala et al. | |
| 2019/0164153 A1* | 5/2019 | Agrawal | H04L 9/008 |
| 2019/0205563 A1* | 7/2019 | Gonzales, Jr. | G06F 16/1805 |
| 2019/0207995 A1* | 7/2019 | Gonzales, Jr. | G06F 16/1805 |
| 2019/0253258 A1 | 8/2019 | Thekadath et al. | |
| 2019/0324772 A1* | 10/2019 | Fan | H04L 9/0637 |
| 2019/0334726 A1* | 10/2019 | Kelly | H04L 9/3247 |
| 2020/0019421 A1* | 1/2020 | Sun | H04L 9/0637 |

FOREIGN PATENT DOCUMENTS

| | | |
|---|---|---|
| CN | 109241359 A | 1/2019 |
| CN | 109687953 A | 4/2019 |
| CN | 109906443 A | 6/2019 |

OTHER PUBLICATIONS

Tien Tuan Anh Dinh et al., "Untangling Blockchain: A Data Processing View of Blockchain Systems,", Arxiv.Org, :;Cornell University Library, 201 Olin Library Cornell University, Ithica, NY, Aug. 17, 2017 (Year: 2017).*

"Java class file", Wikipedia, Jan. 18, 2016 (Year: 2016).*

Hildebrandt et al., "KEVM a Complete Formal Semantics of the Ethereum Virtual Machine", 2018 (Year: 2018).*

Written Opinion of the International Searching Authority and International Search Report for PCT Application No. PCT/CN2019/093591 dated Apr. 1, 2020.

* cited by examiner

421:
raw java source code
of a blockchain
contract

```
Public class Demo {
    private int a=1'
    ...
}
...
```

Compiled by compiler

422:
as-compiled raw java
bytecode of the
blockchain contract

```
ca fe  ba be 00 00 00 33 00 15 0a 00 04 00 11 09
00 03 00 12 07 00 13 07 00 14 01 00 01 61 01 00
... ...
```

Add indicator

1ˢᵗ  2ⁿᵈ
indicator indicator

423:
add one or more
indicators to the
raw java bytecode to
obtain a bytecode of
the blockchain
contract

520

521: generating a bytecode of a blockchain contract, wherein the bytecode comprises one or more indicators, and the one or more indicators comprise a first indicator indicating a virtual machine type for executing the blockchain contract 522: transmitting the bytecode of the blockchain contract to a blockchain node for the blockchain node to trigger a virtual machine of the virtual machine type associated with the first indicator to execute the blockchain contract

FIG. 5B

SYSTEM AND METHOD FOR EXECUTING DIFFERENT TYPES OF BLOCKCHAIN CONTRACTS

CROSS REFERENCE TO RELATED APPLICATION

The present application is a continuation application of International Patent Application No. PCT/CN2019/093591, filed on Jun. 28, 2019, and entitled "SYSTEM AND METHOD FOR EXECUTING DIFFERENT TYPES OF BLOCKCHAIN CONTRACTS", the entire contents of which are incorporated herein by reference.

TECHNICAL FIELD

This application generally relates to methods and devices for executing different types of blockchain contracts.

BACKGROUND

Blockchain provides data storage in a decentralized fashion, by keeping the data in a series of data blocks having precedence relationship between each other. The chain of blocks is maintained and updated by a network of nodes, which are also responsible for validating the data. More recently, blockchain has expanded to provide a framework for execution of blockchain contracts (e.g., smart contracts), which include contractual terms between users written in lines of code. The blockchain contract may be a computer protocol intended to digitally facilitate, verify, or enforce the negotiation or performance of a contract. To handle the blockchain contracts, each node of the blockchain network runs a corresponding virtual machine (VM) and executes the same instructions. A VM is a software emulation of a computer system based on computer architectures that provides functionality of a physical computer. VM in the blockchain context can be understood as a system designed to operate as a runtime environment for blockchain contracts.

Currently, each blockchain system typically supports one type of VM and one corresponding programming language. For example, Ethereum supports Ethereum Virtual Machine (EVM) which requires programming in solidity (a contract-oriented programming language for writing blockchain contracts implemented by EVM). This prevents the acceptance of blockchain contracts written in other program languages, such as c++, java, and python, and turns away users who have not yet mastered the solidity language. If the blockchain system tries to integrate multiple VMs, the cost inevitably rises and data format compatibleness becomes an issue. Thus, it is desirable to provide a mechanism that supports blockchain contracts written in different programming languages and corresponding to different VMs.

SUMMARY

Various embodiments of the specification include, but are not limited to, systems, methods, and non-transitory computer readable media for executing different types of blockchain contracts.

According to some embodiments, a computer-implemented method for executing blockchain contracts comprises: obtaining a bytecode of a blockchain contract, wherein the bytecode comprises one or more indicators, and the one or more indicators comprise a first indicator indicating a virtual machine type for executing the blockchain contract; and executing the blockchain contract using a virtual machine of the virtual machine type associated with the first indicator.

According to other embodiments, the one or more indicators further comprise a second indicator indicating a version of the virtual machine for executing the blockchain contract; and executing the blockchain contract using the virtual machine of the virtual machine type associated with the first indicator comprises executing the blockchain contract using the virtual machine of the virtual machine type associated with the first indicator and the second indicator.

According to one embodiment, obtaining the bytecode of the blockchain contract comprises: obtaining from a client device the bytecode of the blockchain contract, wherein the bytecode is compiled from source code of the blockchain contract, and the source code comprises the one or more indicators.

According to another embodiment, obtaining the bytecode of the blockchain contract comprises: obtaining from a client device source code of the blockchain contract, the source code comprising the one or more indicators; and compiling the source code to obtain the bytecode of the blockchain contract.

According to yet another embodiment, obtaining the bytecode of the blockchain contract comprises: obtaining from a client device a raw bytecode for executing the blockchain contract, wherein the raw bytecode is compiled from raw source code for executing the blockchain contract; and adding the one or more indicators to the raw bytecode to obtain the bytecode of the blockchain contract.

According to still another embodiment, obtaining the bytecode of the blockchain contract comprises: obtaining from a client device raw source code for executing the blockchain contract; compiling the raw source code to obtain a raw bytecode; and adding the one or more indicators to the raw bytecode to obtain the bytecode of the blockchain contract.

According to some embodiments, the first indicator corresponds to a first byte of the bytecode of the blockchain contract.

According to other embodiments, the second indicator corresponds to a second byte of the bytecode of the blockchain contract.

According to yet other embodiments, a third to an $n^{th}$ byte of the bytecode of the blockchain contract correspond to code for executing the blockchain contract, n being a natural number no less than three, and the first to the $n^{th}$ byte of the bytecode of the blockchain contract specifying an application binary interface (ABI) format.

According to still other embodiments, executing the blockchain contract using the virtual machine of the virtual machine type associated with the first indicator comprises: triggering the virtual machine of the virtual machine type associated with the first indicator to deploy the blockchain contract on a corresponding blockchain, the deployed blockchain contract being associated with the virtual machine type.

According to some embodiments, executing the blockchain contract using the virtual machine of the virtual machine type associated with the first indicator further comprises: triggering the virtual machine of the virtual machine type associated with the first indicator to invoke the deployed blockchain contract.

According to other embodiments, the virtual machine type for executing the blockchain contract comprises: a GNU compiler collection (GCC) virtual machine for executing blockchain contracts written in c++ programming language, a java virtual machine (JVM) for executing blockchain contracts written in java programming language, an Ethereum virtual machine (EVM) for executing blockchain contracts written in solidity programming language, or a python virtual machine (PVM) for executing blockchain contracts written in python programming language.

According to yet other embodiments, the first indicator comprises a hexadecimal number.

According to other embodiments, a system for executing blockchain contracts comprises one or more processors and one or more non-transitory computer-readable memories coupled to the one or more processors and configured with instructions executable by the one or more processors to cause the system to perform operations comprising: obtaining a bytecode of a blockchain contract, wherein the bytecode comprises one or more indicators, and the one or more indicators comprise a first indicator indicating a virtual machine type for executing the blockchain contract; and executing the blockchain contract using a virtual machine of the virtual machine type associated with the first indicator.

According to yet other embodiments, a non-transitory computer-readable storage medium for executing blockchain contracts, the storage medium configured with instructions executable by one or more processors to cause the one or more processors to perform operations comprising: obtaining a bytecode of a blockchain contract, wherein the bytecode comprises one or more indicators, and the one or more indicators comprise a first indicator indicating a virtual machine type for executing the blockchain contract; and executing the blockchain contract using a virtual machine of the virtual machine type associated with the first indicator.

According to still other embodiments, an apparatus for executing blockchain contracts comprises an obtaining module for obtaining a bytecode of a blockchain contract, wherein the bytecode comprises one or more indicators, and the one or more indicators comprise a first indicator indicating a virtual machine type for executing the blockchain contract; and an executing module for executing the blockchain contract using a virtual machine of the virtual machine type associated with the first indicator.

According to some embodiments, a computer-implemented method for executing blockchain contracts comprises: generating a bytecode of a blockchain contract, wherein the bytecode comprises one or more indicators, and the one or more indicators comprise a first indicator indicating a virtual machine type for executing the blockchain contract; and transmitting the bytecode of the blockchain contract to a blockchain node for the blockchain node to trigger a virtual machine of the virtual machine type associated with the first indicator to execute the blockchain contract.

According to other embodiments, the one or more indicators further comprise a second indicator indicating a version of the virtual machine for executing the blockchain contract; and transmitting the bytecode of the blockchain contract to the blockchain node for the blockchain node to trigger the virtual machine of the virtual machine type associated with the first indicator to execute the blockchain contract comprises transmitting the bytecode of the blockchain contract to the blockchain node for the blockchain node to trigger the virtual machine of the virtual machine type associated with the first indicator and the second indicator to execute the blockchain contract.

According to yet other embodiments, generating the bytecode of the blockchain contract comprises: compiling source code of the blockchain contract to obtain the bytecode of the blockchain, the source code comprising the one or more indicators.

According to still other embodiments, generating the bytecode of the blockchain contract comprises: compiling raw source code for executing the blockchain contract to obtain a raw bytecode for executing the blockchain contract; and adding the one or more indicators to the raw bytecode to obtain the bytecode of the blockchain contract.

According to some embodiments, the first indicator corresponds to a first byte of the bytecode of the blockchain contract, the second indicator corresponds to a second byte of the bytecode of the blockchain contract, and a third to an $n^{th}$ byte of the bytecode of the blockchain contract correspond to code for executing the blockchain contract, n being a natural number no less than three, and the first to the $n^{th}$ byte of the bytecode of the blockchain contract specifying an application binary interface (ABI) format.

According to other embodiments, transmitting the bytecode of the blockchain contract to the blockchain node for the blockchain node to trigger the virtual machine of the virtual machine type associated with the first indicator to execute the blockchain contract comprises: transmitting the bytecode of the blockchain contract to the blockchain node for the blockchain node to trigger the virtual machine of the virtual machine type associated with the first indicator to deploy the blockchain contract on a corresponding blockchain, the deployed blockchain contract being associated with the virtual machine type.

According to yet other embodiments, transmitting the bytecode of the blockchain contract to the blockchain node for the blockchain node to trigger the virtual machine of the virtual machine type associated with the first indicator to execute the blockchain contract further comprises: transmitting the bytecode of the blockchain contract to the blockchain node for the blockchain node to trigger the virtual machine of the virtual machine type associated with the first indicator to invoke the deployed blockchain contract.

According to some embodiments, a system for executing blockchain contracts comprises one or more processors and one or more non-transitory computer-readable memories coupled to the one or more processors and configured with instructions executable by the one or more processors to cause the system to perform operations comprising: generating a bytecode of a blockchain contract, wherein the bytecode comprises one or more indicators, and the one or more indicators comprise a first indicator indicating a virtual machine type for executing the blockchain contract; and transmitting the bytecode of the blockchain contract to a blockchain node for the blockchain node to trigger a virtual machine of the virtual machine type associated with the first indicator to execute the blockchain contract.

According to other embodiments, a non-transitory computer-readable storage medium for executing blockchain contracts, the storage medium configured with instructions executable by one or more processors to cause the one or more processors to perform operations comprising: generating a bytecode of a blockchain contract, wherein the bytecode comprises one or more indicators, and the one or more indicators comprise a first indicator indicating a virtual machine type for executing the blockchain contract; and transmitting the bytecode of the blockchain contract to a blockchain node for the blockchain node to trigger a virtual machine of the virtual machine type associated with the first indicator to execute the blockchain contract.

According to yet other embodiments, an apparatus for executing blockchain contracts comprises a generating module for generating a bytecode of a blockchain contract, wherein the bytecode comprises one or more indicators, and the one or more indicators comprise a first indicator indicating a virtual machine type for executing the blockchain contract; and a transmitting module for transmitting the bytecode of the blockchain contract to a blockchain node for the blockchain node to trigger a virtual machine of the virtual machine type associated with the first indicator to execute the blockchain contract.

According to still other embodiments, a system for executing blockchain contracts comprising: one or more processors; and one or more computer-readable memories coupled to the one or more processors and having instructions stored thereon that are executable by the one or more processors to perform the method of any of the preceding embodiments.

According to some embodiments, an apparatus for executing blockchain contracts comprises a plurality of modules for performing the method of any of the preceding embodiments.

According to some embodiments, a non-transitory computer-readable medium has stored therein instructions that, when executed by a processor of a device, cause the device to perform the method of any of the preceding embodiments.

Embodiments disclosed in the specification have one or more technical effects. In some embodiments, the bytecode contains a first indicator of the virtual machine type for executing the corresponding blockchain contract. Thus, when a blockchain node tries to deploy the blockchain contract, it can identify the correct virtual machine to trigger according to this format of the bytecode. In other embodiments, the bytecode also contains a second indicator of the version of the virtual machine for executing the corresponding blockchain contract. Thus, the appropriate version of the virtual machine is triggered to deploy the blockchain contract. In still other embodiments, the first indicator takes the first byte of the bytecode, the second indicator takes the second byte, and a third to an $n^{th}$ byte of the bytecode correspond to code for executing the blockchain contract, the first to the $n^{th}$ byte of the bytecode of the blockchain contract specifying an application binary interface (ABI) format. In some embodiments, by adopting such format, a blockchain system can easily integrate different types of virtual machines at a low cost while having compatible data exchanges. Blockchain nodes (e.g., full nodes) can improve their efficiencies by incorporating the different types of virtual machines. Client devices (e.g., lightweight nodes) may no longer be restricted to a particular type of programming language in order to interact with the blockchain system. In other embodiments, the blockchain system can support blockchain contracts written in different programming languages and corresponding to different virtual machines. Blockchain contracts are no longer required to be written in an exclusive programming language. In yet other embodiments, different virtual machines can be integrated to the hardware machine of the blockchain node and tapped to deploy, invoke, or otherwise operate on the blockchain contracts written in any programming language, without incurring the cost for individually developing bytecode systems for the different virtual machines. Accordingly, the communicativeness and compatibleness of the blockchain system are significantly expanded.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 4B illustrates a flowchart of another method for adding indicators, in accordance with some embodiments.

FIG. 5B illustrates a flowchart of another method for executing blockchain contracts, in accordance with some embodiments.

DETAILED DESCRIPTION

Figure 1:
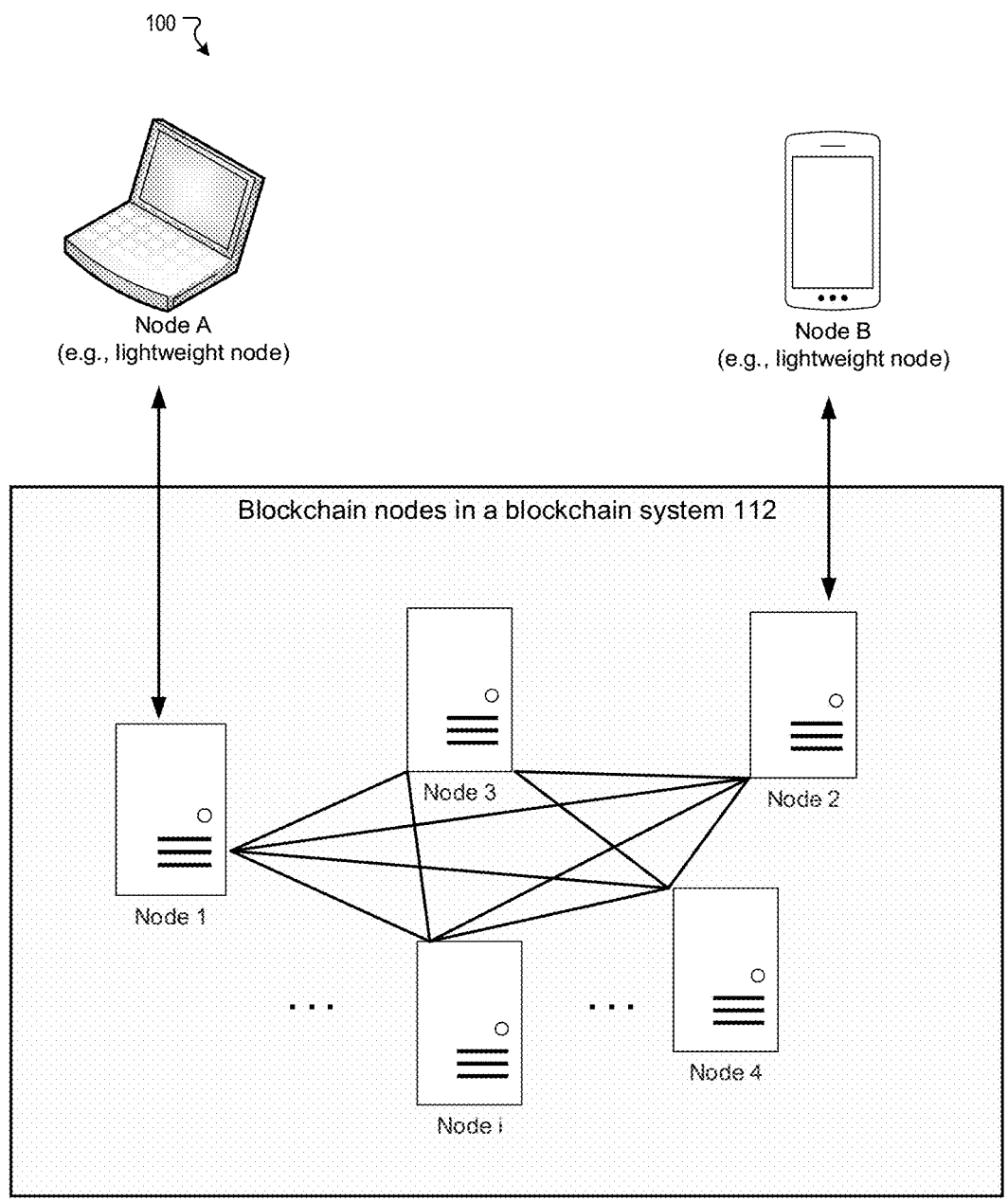
FIG. 1 illustrates a system for executing blockchain contracts, in accordance with some embodiments.

FIG. 1 shows an example of a blockchain network 100, in accordance with some embodiments. As shown, the blockchain network 100 may comprise one or more client devices (e.g., Node A, Node B, etc.) coupled to a blockchain system 112. The client devices may include lightweight nodes. A lightweight node may not download the complete blockchain, but may instead just download the block headers to validate the authenticity of the blockchain transactions. Lightweight nodes may be served by and effectively dependent on full nodes (e.g., those in the blockchain system 112) to access more functions of the blockchain. The lightweight nodes may be implemented in electronic devices such as laptops, mobile phones, and the like by installing an appropriate software.

The blockchain system 112 may comprise a plurality of blockchain nodes (e.g., Node 1, Node 2, Node 3, Node 4, Node i, etc.), which may include full nodes. Full nodes may download every block and blockchain transaction and check them against the blockchain's consensus rules. The blockchain nodes may form a network (e.g., peer-to-peer network) with one blockchain node communicating with another. The order and the number of the blockchain nodes as shown are merely examples and for the simplicity of illustration. The blockchain nodes may be implemented in servers, computers, etc. For example, the blockchain nodes may be implemented in a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

Each of the client devices and blockchain nodes may be installed with appropriate software (e.g., application program interface) and/or hardware (e.g., wires, wireless connections) to access other devices of the blockchain network 100. In general, the client devices and blockchain nodes may be able to communicate with one another through one or more wired or wireless networks (e.g., the Internet) through which data can be communicated. Each of the client devices and blockchain nodes may include one or more processors and one or more memories coupled to the one or more processors. The memories may be non-transitory and computer-readable and be configured with instructions executable by one or more processors to cause the one or more processors to perform operations described herein. The instructions may be stored in the memories or downloaded over a communications network without necessarily being stored in the memories. Although the client devices and blockchain nodes are shown as separate components in this figure, it will be appreciated that these systems and devices can be implemented as single devices or multiple devices coupled together. That is, a client device (e.g., Node A) may be alternatively integrated into a blockchain node (e.g., Node 1).

The client devices such as Node A and Node B may be installed with an appropriate blockchain software to initiate, forward, or access blockchain transactions. Node A may access the blockchain through communications with Node 1 or one or more other blockchain nodes, and Node B may access the blockchain through communications with Node 2 or one or more other blockchain nodes. Node A may submit a blockchain transaction to the blockchain through Node 1 or similar nodes to request adding the blockchain transaction to the blockchain. The submitted blockchain transaction may comprise a blockchain contract (e.g., smart contract) for deployment on the blockchain. In some embodiments, the term "blockchain transaction" (or "transaction" for short) may be implemented via a blockchain system and recorded to the blockchain. The blockchain transaction may include, for example, a financial transaction, a blockchain contract transaction for deploying or invoking a blockchain contract, a blockchain transaction that updates a state (e.g., world state) of the blockchain, etc. The blockchain transaction does not have to involve a financial exchange.

The blockchain may be maintained by the blockchain nodes each comprising or coupling to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of blockchain transactions submitted by the one or more client devices similar to Node A.

In some embodiments, after receiving a blockchain transaction request of an unconfirmed blockchain transaction, the recipient blockchain node may perform some preliminary verification of the blockchain transaction. For example, Node 1 may perform the preliminary verification after receiving the blockchain transaction from Node A. Once verified, the blockchain transaction may be stored in the pool database of the recipient blockchain node (e.g., Node 1), which may also forward the blockchain transaction to one or more other blockchain nodes (e.g., Node 3, Node 4). The one or more other blockchain nodes may repeat the process done by the recipient node.

Once the blockchain transactions in the corresponding pool database reach a certain level (e.g., a threshold amount), the blockchain nodes may each verify the batch of blockchain transactions in the corresponding pool database according to consensus rules or other rules. If the blockchain transaction involves a blockchain contract (e.g., smart contract), the blockchain node may execute the blockchain contract locally. The blockchain contract may include user-written contract code. For example, a blockchain transaction may encode data in contract code for data storage (by contract deployment) or retrieval (by invoking a deployed contract).

A certain blockchain node that successfully verifies its batch of blockchain transactions in accordance with consensus rules may pack the blockchain transactions into its local copy of the blockchain and multicast the results to other blockchain nodes. The certain blockchain node may be a blockchain node that has first successfully completed the verification, that has obtained the verification privilege, or that has been determined based on another consensus rule, etc. Then, the other blockchain nodes may execute the blockchain transactions locally, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories. As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, Node B may request to invoke the deployed blockchain contract to perform various operations. For example, data stored in the deployed blockchain contract may be retrieved. For another example, data may be added to the deployed blockchain contract. For yet another example, a financial transaction specified in the deployed blockchain contract may be executed. Notwithstanding the above, other types of blockchain systems and associated consensus rules may be applied to the disclosed blockchain system. An example of deploying and calling a blockchain contract is provided below with respect to FIG. 2A and FIG. 2B.

Figure 2A:
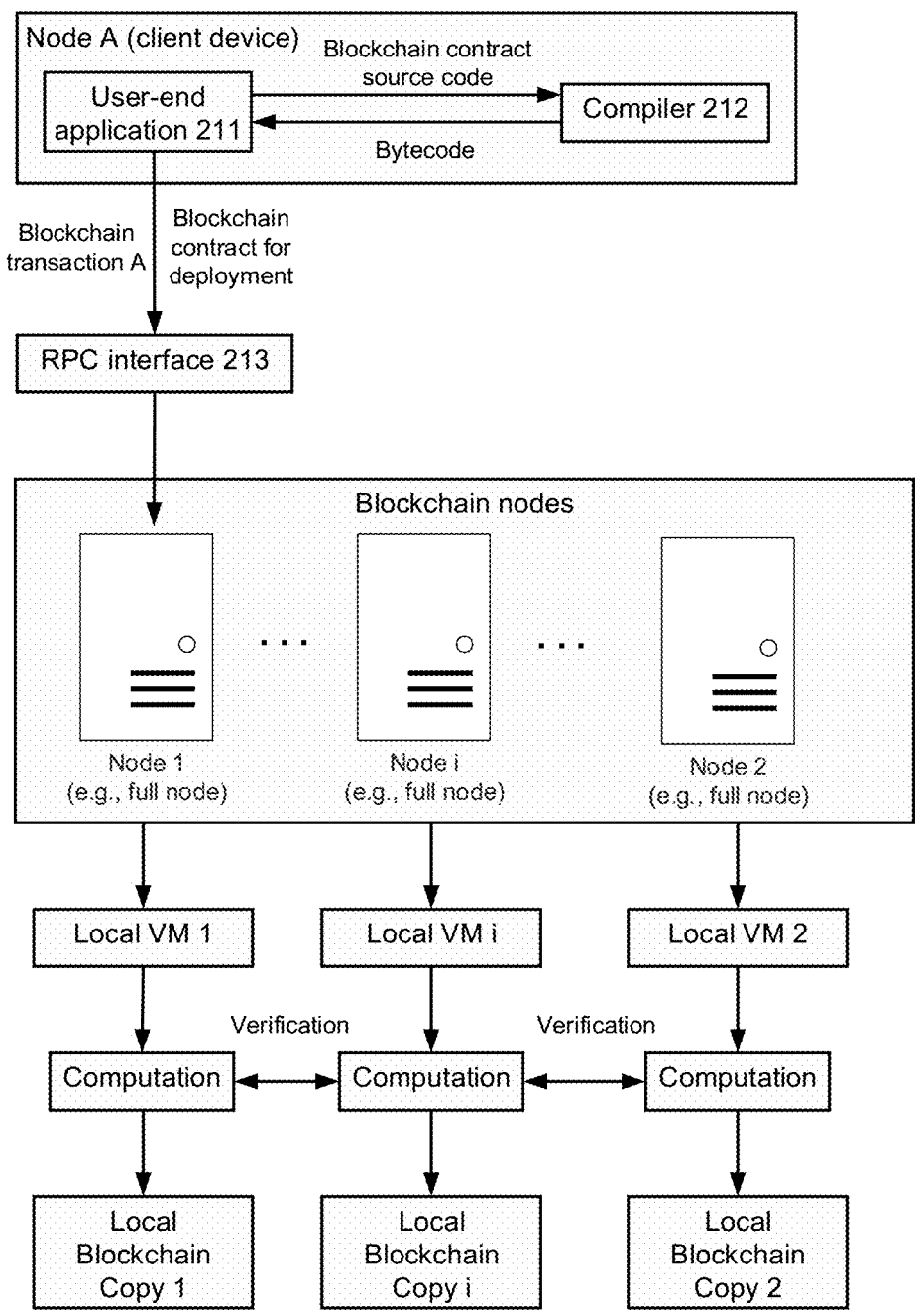
FIG. 2A and FIG. 2B illustrate a framework for executing blockchain contracts, in accordance with some embodiments.
Figure 2B:
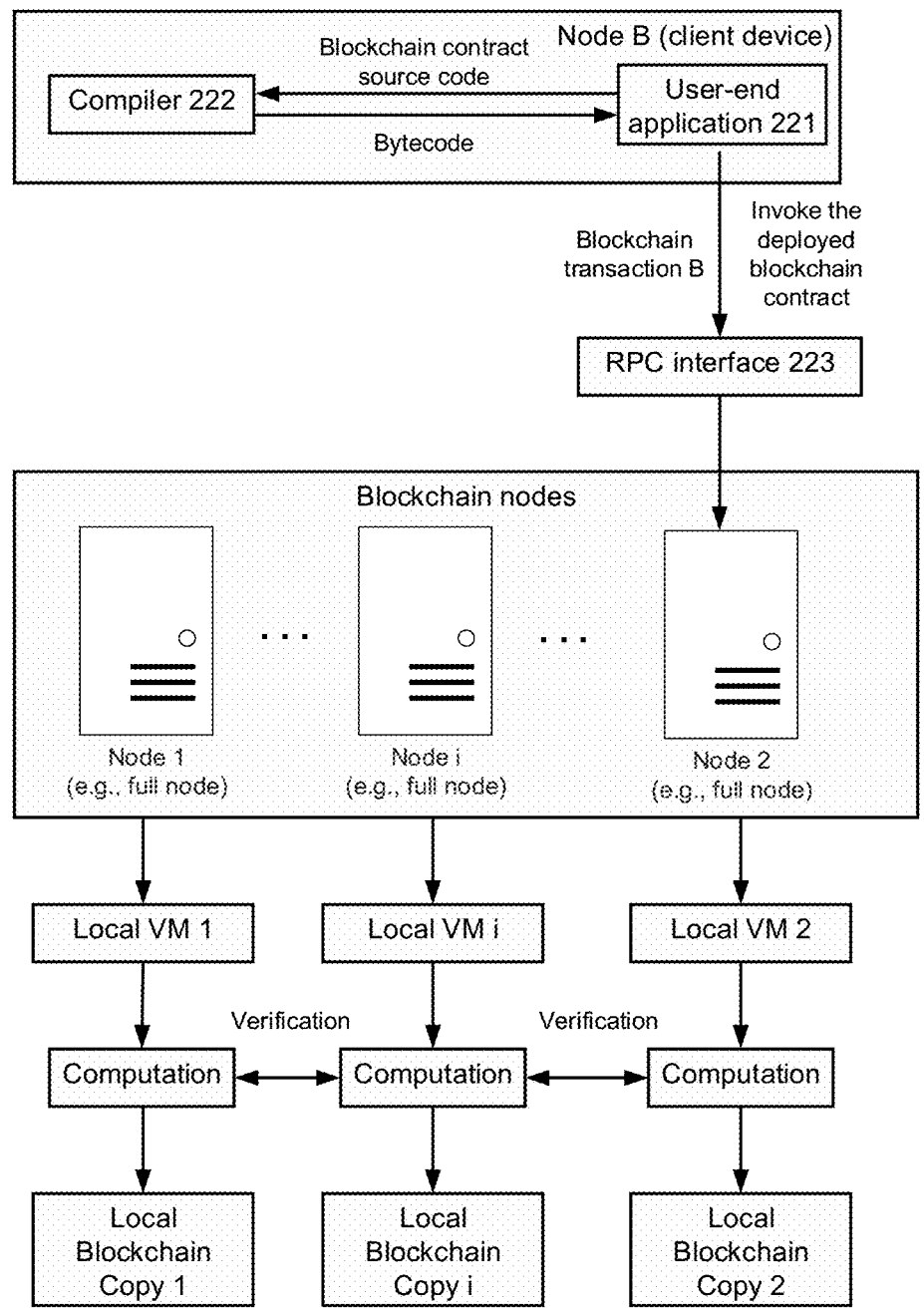

FIG. 2A and FIG. 2B illustrate a framework for executing blockchain contracts, in accordance with some embodiments. FIG. 2A shows deploying a blockchain contract, in accordance with some embodiments. In some embodiments, a blockchain contract may start with its construction in source code. For example, a user A may program a blockchain contract in source code and input the source code to an interface of a user-end application 211. In this figure, the user-end application 211 is installed in Node A. The source code may be written in a programming language such as java, c++, python, solidity, etc. To deploy the blockchain contract, Node A may compile the blockchain contract source code using a corresponding compiler 212, which converts the source code into bytecode. Bytecode may be program code that has been compiled from source code into low-level code designed for a software interpreter. After receiving the bytecode, the user-end application may generate a blockchain transaction A including the bytecode and submit the blockchain transaction to one or more of the blockchain nodes. For example, the blockchain transaction may comprise information such as nonce (e.g., blockchain transaction serial number), from (e.g., an address of user A's account), to (e.g., empty if deploying a blockchain contract), GasLimit (e.g., an upper limit of blockchain transaction fee consumed for the blockchain transaction), GasPrice (e.g., a blockchain transaction fee offered by the sender), value (e.g., a financial transaction amount), data (e.g., the bytecode), etc. Node A may sign the blockchain transaction with various encryption methods to represent endorsement by Node A.

Node A may send the blockchain transaction to a blockchain node (e.g., Node 1) through a remote procedure call (RPC) interface 213. RPC is a protocol that a first program (e.g., user-end application) can use to request a service from a second program located in another computer on a network (e.g., blockchain node) without having to understand the network's details. When the first program causes a procedure to execute in a different address space (e.g., on Node 1), it is as if a normal (local) procedure call, without the programmer explicitly coding the details for the remote interaction.

Though the compiler is shown to be included in the client device Node A, in some embodiments, the compiler can be alternatively included in another device accessible to the client device. The client device may couple to the compiler remotely to compile the source code into bytecode. In some other embodiments, the compiler can be alternatively included in the blockchain node (e.g., Node 1) or in another device accessible to the blockchain node. The blockchain node may obtain the source code from the client device and compile the source code into bytecode using the compiler. In yet other embodiments, the client device (e.g., Node A whether or not including the compiler) may be integrated with the blockchain node (e.g., Node 1). The steps performed by the client device may then be performed by the blockchain node.

In some embodiments, the bytecode obtained by the blockchain node (e.g., Node 1) may follow a format described below with reference to FIG. 3A. For example, the bytecode may include one or more indicators indicating a type of VM for executing the blockchain contract, a version of the VM, etc. There are a variety of ways for the blockchain node to obtain the bytecode including the one or more indicators. In one example, a source code version of the indicators may be included into the source code which is then compiled into bytecode, so that the bytecode includes a bytecode version of the indicators. The user, the client device, or the blockchain node may add the source code version of the indicators to the source code. In another example, the source code does not include the indicators, and after the source code is compiled into bytecode, a bytecode version of the indicators may be included into the bytecode. The user, the client device, or the blockchain node may add the bytecode version of the indicators to the bytecode.

On receiving the blockchain transaction, as described earlier, Node 1 may verify if the blockchain transaction is valid. For example, the signature of Node A and other formats may be verified. If the verification succeeds, Node 1 may broadcast the blockchain transaction to the blockchain network including various other blockchain nodes. Some blockchain nodes may participate in the mining process of the blockchain transactions. The blockchain transaction sent by Node A may be picked by a certain node for consensus verification to pack into a new block. The certain node may create a contract account for the blockchain contract in association with a contract account address. The certain node may trigger its local VM to execute the blockchain contract, thereby deploying the blockchain contract to its local copy of the blockchain and updating the account states in the blockchain. If the certain node succeeds in mining the new block, the certain node may broadcast the new block to other blockchain nodes. The other blockchain nodes may verify the new block as mined by the certain blockchain node. If consensus is reached, the blockchain transaction is respectively packed to the local copies of the blockchain maintained by the blockchain nodes. The blockchain nodes may similarly trigger their local VMs (e.g., local VM 1, local VM i, local VM 2) to execute the blockchain contract, thus invoking the blockchain contract deployed on the local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain contract. Likewise, all other blockchain transactions in the new block will be executed. Lightweight nodes may also synchronize to the updated blockchain.

FIG. 2B shows invoking a deployed blockchain contract, in accordance with some embodiments. The steps are similar to the blockchain contract deployment described above with certain changes to the transmitted data. In some embodiments, a user B may program an instruction to invoke a blockchain contract in source code and input the source code to an interface of a user-end application 221. In this figure, the user-end application 221 is installed in Node B. The source code may be written in a programming language such as java, c++, python, solidity, etc. To invoke the blockchain contract, Node B may compile the instruction using a corresponding compiler 222, which converts the source code into bytecode. After receiving the bytecode, the user-end application may generate a blockchain transaction B including the bytecode and submit the blockchain transaction to one or more of the blockchain nodes. For example, the blockchain transaction may comprise information such as nonce (e.g., blockchain transaction serial number), from (e.g., an address of user B's account), to (e.g., an address of the deployed blockchain contract), GasLimit (e.g., an upper limit of blockchain transaction fee consumed for the blockchain transaction), GasPrice (e.g., a blockchain transaction fee offered by the sender), value (e.g., a financial transaction amount), data (e.g., the bytecode), etc. Node B may sign the blockchain transaction with various encryption methods to represent endorsement by Node B. Node B may send the blockchain transaction to a blockchain node (e.g., Node 2) through a remote procedure call (RPC) interface 223.

Similar to the above description, though the compiler is shown to be included in the client device Node B, in some embodiments, the compiler can be alternatively included in another device accessible to the client device, in the blockchain node (e.g., Node 2), or in another device accessible to the blockchain node. In some embodiments, the bytecode obtained by the blockchain node (e.g., Node 2) may follow a format described below with reference to FIG. 3B. The bytecode may or may not include one or more indicators indicating a type of VM for executing the blockchain contract, a version of the VM, etc.

On receiving the blockchain transaction, Node 2 may verify if the blockchain transaction is valid. For example, the signature of Node B and other formats may be verified. If the verification succeeds, Node 2 may broadcast the blockchain transaction to the blockchain network including various other blockchain nodes. Some blockchain nodes may participate in the mining process of the blockchain transactions. The blockchain transaction sent by Node B may be picked by a certain node for consensus verification to pack into a new block. The certain node may trigger its local VM to execute the blockchain contract, thereby invoking the blockchain contract deployed on its local copy of the blockchain and updating the account states in the blockchain. If the certain node succeeds in mining the new block, the certain node may broadcast the new block to other blockchain nodes. The other blockchain nodes may verify the new block as mined by the certain blockchain node. If consensus is reached, the blockchain transaction is respectively packed to the local copies of the blockchain maintained by the blockchain nodes. The blockchain nodes may similarly trigger their local VMs (e.g., local VM 1, local VM i, local VM 2) to execute the blockchain contract, thus invoking the blockchain contract deployed on the local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain contract. Likewise, all other blockchain transactions in the new block will be executed. Lightweight nodes may also synchronize to the updated blockchain.

Figure 3A:
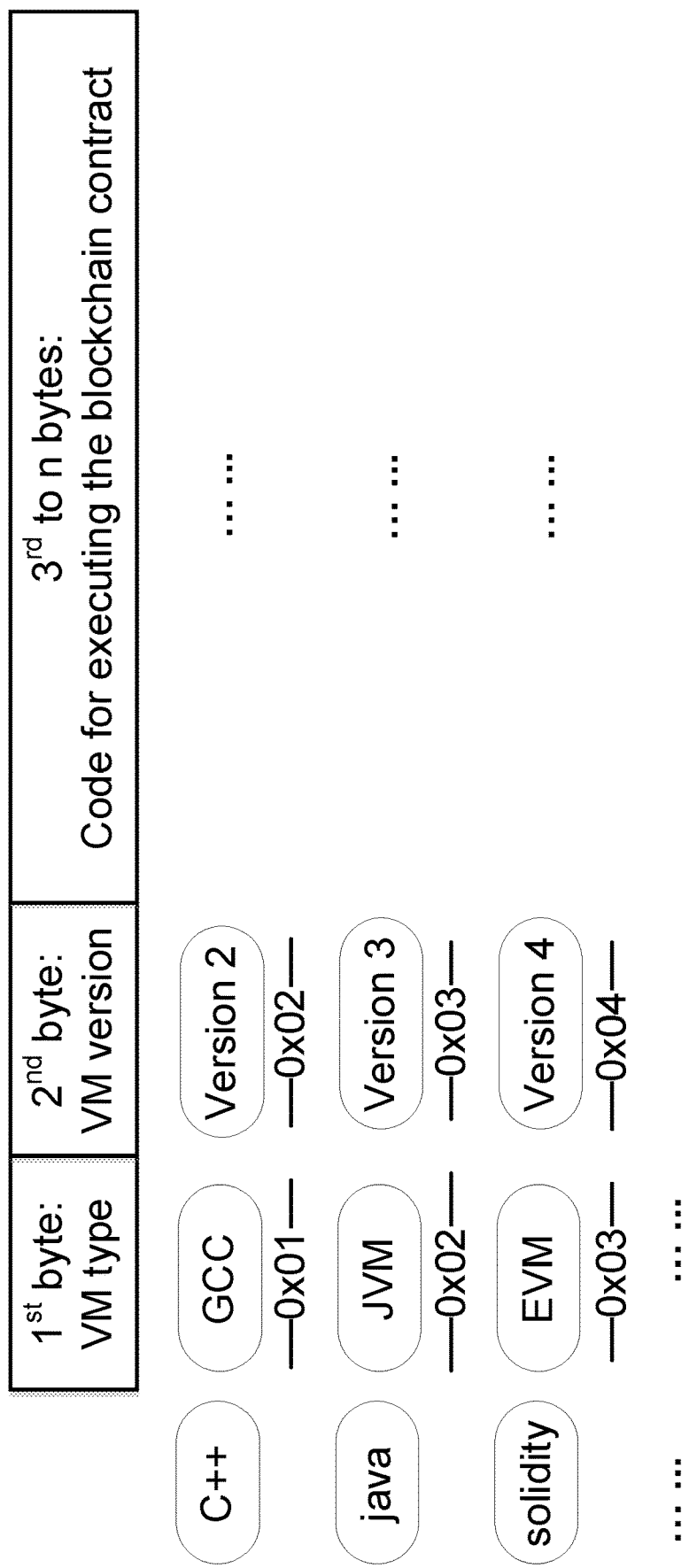
FIG. 3A illustrates a bytecode for deploying blockchain contracts, in accordance with some embodiments.

FIG. 3A illustrates a bytecode for deploying blockchain contracts, in accordance with some embodiments. In some embodiments, a user may construct a blockchain contract in various programming languages (e.g., java, c++, python, solidity, etc.). The blockchain contract may be written in human-readable source code in the various programming languages, with a front-end software loaded to the client device. Then, a compiler may be triggered to compile the source code into bytecode. The compiler may be a computer software that transforms computer code written in one programming language into another programming language. Compilers can translate source code from a high-level programming language to a lower level language (e.g., bytecode) to create an executable program. Bytecode, also termed portable code, p-code, object code, or machine code, is a form of instruction set designed for efficient execution by a software interpreter. Unlike the human-readable source code, bytecodes may include compact numeric codes, constants, and references (e.g., numeric addresses) that encode the result of compiler parsing and performing semantic analysis of program objects. The bytecode can be read and executed by a corresponding VM.

As described earlier, the bytecode obtained by the blockchain node may include one or more indicators indicating a type of VM for executing the blockchain contract, a version of the VM, etc. The indicators may be added by a user, a client device, or a blockchain node. The indicators may be added as source code to raw source code, and then the raw source code with the indicators is compiled into the bytecode shown in FIG. 3A. An example of such addition is described in more details below with reference to FIG. 4A. Alternatively, the indicators may be added as bytecode into a raw bytecode that is compiled from raw source code and that does not include the indicators, so as to obtain the bytecode shown in FIG. 3A. An example of such addition is described in more details below with reference to FIG. 4B. The word "raw" may indicate that the corresponding code does not include the one or more indicators.

Still referring to FIG. 3A, in some embodiments, the client device (e.g., with a cryptocurrency wallet or another blockchain platform software installed) may prompt the user to enter, select, or otherwise identify the VM type for executing the blockchain contract. For example, java-written blockchain contracts may correspond to java virtual machine (JVM) for execution, c++-written blockchain contracts may corresponding to GNU compiler collection (GCC) VM for execution, python-written blockchain contracts may correspond to python virtual machine (PVM) for execution, and solidity-written contracts may correspond to Ethereum Virtual Machine (EVM) for execution. Depending on how the blockchain contract is written, each blockchain contract may be executable by one or more versions of the corresponding VM. The user may add a first indicator to represent the VM type and/or a second indicator to represent the VM version in source code. Alternatively, the client device may auto-analyze the raw source code as written and add the first and/or second indicators.

In some embodiments, as shown in FIG. 3A, the first indicator may occupy the first byte of the bytecode, and the second indicator may occupy the second byte of the bytecode. The $3^{rd}$ to the $n^{th}$ bytes of the bytecode may correspond to other code for executing the blockchain contract, where n is a natural number no less than three. There can be various ways for representing the VM type. For example, "01" (a binary representation) or "0x01" (a hexadecimal representation) may represent GCC, "02" or "0x02" may represent JVM, "03" or "0x03" may represent a contract in EVM, and "04" or "0x04" may represent PVM. The bytecode may exist as a binary file, which can also be expressed in hexadecimal representation. A person of ordinary skill in the art will appreciate the use of various other types of indicator representations, the addition of the indicators to other alternative locations in the bytecode, and the use of additional byte spaces for representing the indicators.

In some embodiments, a blockchain node may obtain the bytecode comprising the one or more indicators. The blockchain node may have access to one or more VMs. The blockchain node may parse a portion (e.g., the first and second bytes) of the bytecode and trigger a corresponding VM to execute the blockchain contract. For example, the blockchain node may deploy the blockchain contract. The triggered VM may turn the bytecode into assembly language or other instruction set that can be run by a processor. For example, GCC, JVM, EVM, PVM, or another corresponding VM may be called to execute the blockchain contract.

Figure 3B:
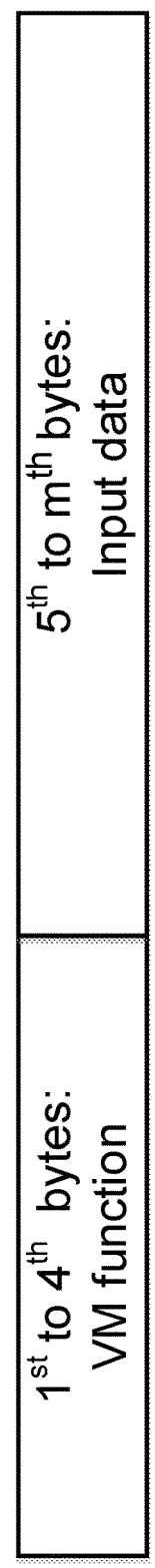
FIG. 3B illustrates a bytecode for invoking blockchain contracts, in accordance with some embodiments.

FIG. 3B illustrates a bytecode for invoking blockchain contracts, in accordance with some embodiments. As described earlier, the blockchain node (e.g., Node 2) may obtain the bytecode for invoking the blockchain contract. As shown, the $1^{st}$ to the $4^{th}$ bytes of the bytecode for invoking the blockchain contract may correspond to a VM function (e.g., a function to extract information of the deployed blockchain contract, a function to conduct a financial transaction according to the deployed blockchain contract), and the $5^{th}$ to $m^{th}$ bytes may correspond to input data (e.g., parameters such as a financial transaction amount), where m is a natural number no less than five. The bytecode for invoking the blockchain contract may not include the one or more indicators. This is because, as discussed earlier, the deployed blockchain contract corresponds to a contract account at a contract account address on the blockchain. The contract account address is associated with the one or more indicators. Thus, according to the contract account address, a blockchain node can retrieve the bytecode shown in FIG. 3A as deployed on the blockchain and then input the bytecode shown in FIG. 3B to the retrieved bytecode to invoke the deployed blockchain contract. Since the deployed blockchain contract already contains the bytecode with the indicators, the bytecode for invoking the deployed blockchain contract (FIG. 3B) does not have to include the indicators. The bytecode for invoking the deployed blockchain contract (FIG. 3B) may be a subset of the $3^{rd}$ to the $n^{th}$ bytes of the bytecode in FIG. 3A.

Figure 4A:
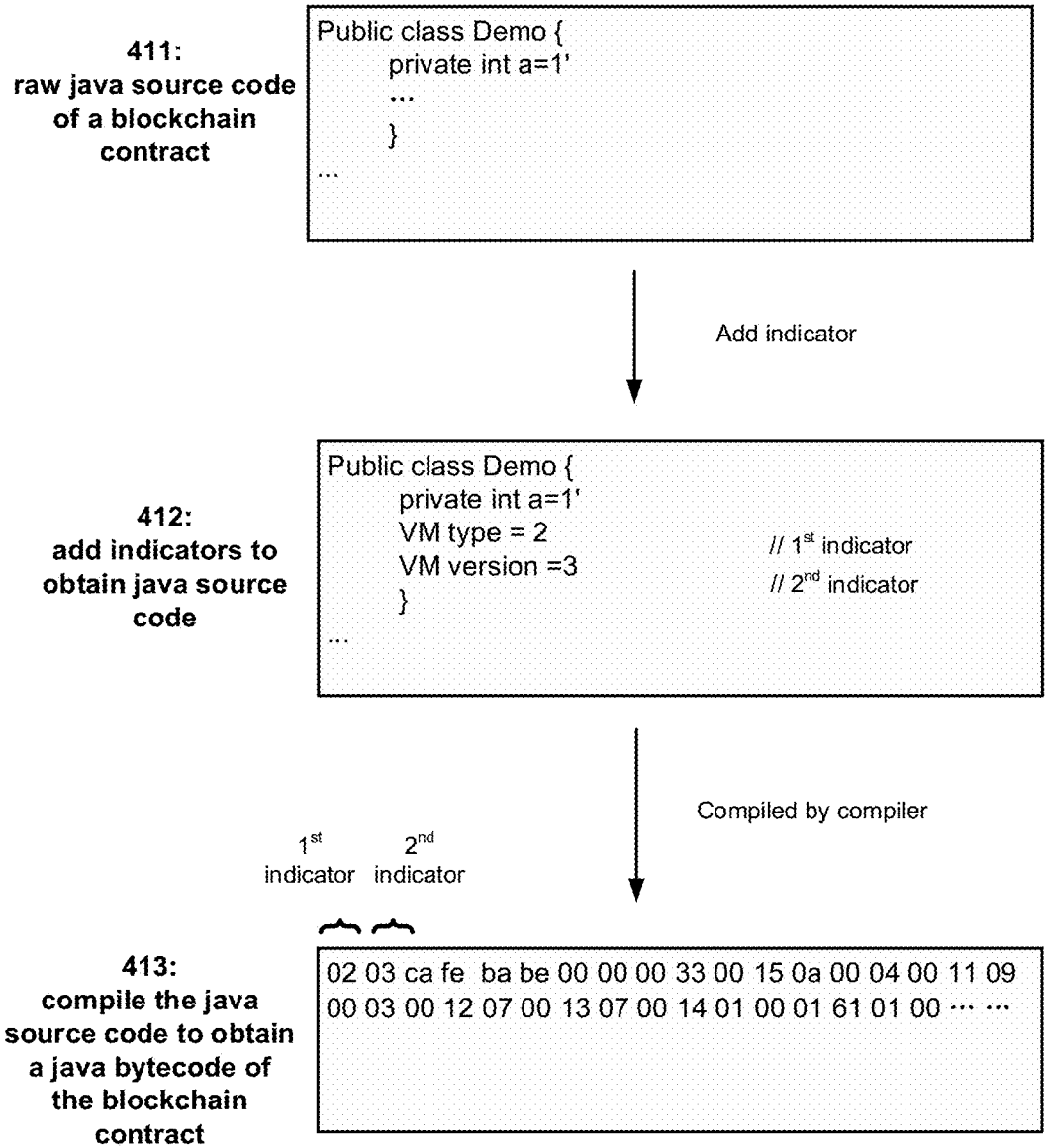
FIG. 4A illustrates a flowchart of a method for adding indicators, in accordance with some embodiments.

FIG. 4A illustrates a flowchart of a method for adding indicators, in accordance with some embodiments. The operations presented below are intended to be illustrative. Depending on the implementation, the exemplary steps may include additional, fewer, or alternative steps performed in various orders or in parallel. Though FIG. 4A uses java as an exemplary programming language, various other programming languages may be used to write the blockchain contract.

At step 411, a user may program a blockchain contract in java on a client device. A part of the exemplary raw java source code is shown. The raw java source code may not comprise the indicators.

At step 412, the user or the user's client device may add the one or more indicators in java source code.

At step 413, the compiler may compile the source code with the indicators into a bytecode of the blockchain contract. As an example, the first few bytes of the as-compiled java bytecode are shown. The compiled java bytecode may be comprised in a binary data file as instructions for a JVM to execute the blockchain contract.

FIG. 4B illustrates a flowchart of a method for adding indicators, in accordance with some embodiments. The operations presented below are intended to be illustrative. Depending on the implementation, the exemplary steps may include additional, fewer, or alternative steps performed in various orders or in parallel. Though FIG. 4B uses java as an exemplary programming language, various other programming languages may be used to write the blockchain contract.

At step 421, a user may program a blockchain contract in java on a client device. A part of the exemplary raw java source code is shown. The raw java source code may not comprise the indicators.

At step 422, the compiler may compile the raw source code into a raw bytecode of the blockchain contract. As an example, the first few bytes of the as-compiled raw java bytecode are shown.

At step 423, the client device may insert one or more indicators in the as-compiled raw java bytecode to obtain a java bytecode of the blockchain contract. As an example shown here, the indicators may be added to the very front of the bytecode. In this example, the first indicator is 02 which refers to JVM, and the second indicator is 03 which refers to version 3.

Figure 5A:
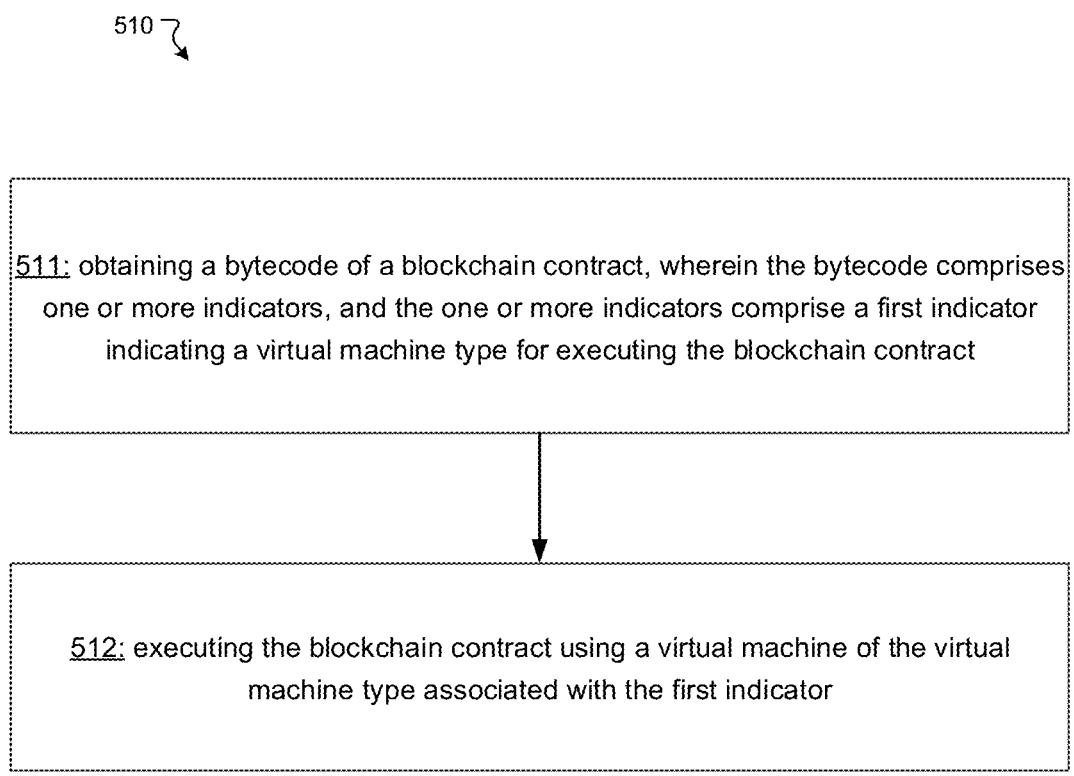
FIG. 5A illustrates a flowchart of a method for executing blockchain contracts, in accordance with some embodiments.

FIG. 5A illustrates a flowchart of an exemplary method 510 for executing blockchain contracts, according to some embodiments of this specification. The method 510 may be implemented by one or more components of the blockchain network 100 of FIG. 1 (e.g., Node 1, Node 2, . . . , or Node i described above or a similar device, or a combination of any of the nodes and one or more additional devices such as Node A). The method 510 may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 510. The operations of method 510 presented below are intended to be illustrative. Depending on the implementation, the method 510 may include additional, fewer, or alternative steps performed in various orders or in parallel. Further details of the method 510 can be referred to FIG. 1 to FIG. 4B and related descriptions above.

In some embodiments, Node 1 may perform the method 510. Block 511 includes: obtaining a bytecode of a blockchain contract, wherein the bytecode comprises one or more indicators, and the one or more indicators comprise a first indicator indicating a virtual machine type for executing the blockchain contract. In some embodiments, the one or more indicators further comprise a second indicator indicating a version of the virtual machine for executing the blockchain contract; and executing the blockchain contract using the virtual machine of the virtual machine type associated with the first indicator comprises executing the blockchain contract using the virtual machine of the virtual machine type associated with the first indicator and the second indicator. Block 512 includes: executing the blockchain contract using a virtual machine of the virtual machine type associated with the first indicator.

In one embodiment, obtaining the bytecode of the blockchain contract comprises: obtaining from a client device the bytecode of the blockchain contract, wherein the bytecode is compiled from source code of the blockchain contract, and the source code comprises the one or more indicators (in source code). For example, the source code may be compiled by a client device to generate the bytecode.

In another embodiment, obtaining the bytecode of the blockchain contract comprises: obtaining from a client device source code of the blockchain contract, the source code comprising the one or more indicators (in source code); and compiling the source code to obtain the bytecode of the blockchain contract. For example, the blockchain node may comprise or otherwise have access to a compiler to compile the source code.

In yet another embodiment, obtaining the bytecode of the blockchain contract comprises: obtaining from a client device a raw bytecode for executing the blockchain contract, wherein the raw bytecode is compiled from raw source code for executing the blockchain contract; and adding the one or more indicators (in bytecode) to the raw bytecode to obtain the bytecode of the blockchain contract. The raw source code and the raw bytecode may not comprise the one or more indicators. The source code may be compiled by a client device to generate the bytecode.

In still another embodiment, obtaining the bytecode of the blockchain contract comprises: obtaining from a client device raw source code for executing the blockchain contract; compiling the raw source code to obtain a raw bytecode; and adding the one or more indicators (in bytecode) to the raw bytecode to obtain the bytecode of the blockchain contract. The raw source code and the raw bytecode may not comprise the one or more indicators. The blockchain node may comprise or otherwise have access to a compiler to compile the source code.

In some embodiments, the first indicator corresponds to a first byte of the bytecode of the blockchain contract. The second indicator corresponds to a second byte of the bytecode of the blockchain contract. A third to an $n^{th}$ byte of the bytecode of the blockchain contract correspond to code for executing the blockchain contract, n being a natural number no less than three, and the first to the n$^{th}$ byte of the bytecode of the blockchain contract specifying an application binary interface (ABI) format, which facilitates interactions between the user-end devices and the virtual machines. The first or second indicator comprises a binary number, a hexadecimal number, etc.

In other embodiments, executing a blockchain contract may include deploying, invoking, or performing another operation on the blockchain contract. In one embodiment, executing the blockchain contract using the virtual machine of the virtual machine type associated with the first indicator comprises: triggering the virtual machine of the virtual machine type associated with the first indicator to deploy the blockchain contract on a corresponding blockchain, the deployed blockchain contract being associated with the virtual machine type. In another embodiment, executing the blockchain contract using the virtual machine of the virtual machine type associated with the first indicator further comprises: triggering the virtual machine of the virtual machine type associated with the first indicator to invoke the deployed blockchain contract.

In yet other embodiments, the virtual machine type for executing the blockchain contract comprises: a GNU compiler collection (GCC) virtual machine for executing blockchain contracts written in c++ programming language, a java virtual machine (JVM) for executing blockchain contracts written in java programming language, an Ethereum virtual machine (EVM) for executing blockchain contracts written in solidity programming language, or a python virtual machine (PVM) for executing blockchain contracts written in python programming language.

FIG. 5B illustrates a flowchart of an exemplary method 520 for executing blockchain contracts, according to some embodiments of this specification. The method 520 may be implemented by one or more components of the blockchain network 100 of FIG. 1 (e.g., Node A, Node B, or a similar device, or a combination of any of the nodes and one or more additional devices such as Node 1, Node 2). The method 520 may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 520. The operations of method 520 presented below are intended to be illustrative. Depending on the implementation, the method 520 may include additional, fewer, or alternative steps performed in various orders or in parallel. Further details of the method 520 can be referred to FIG. 1 to FIG. 4B and related descriptions above. The various embodiments described with reference to FIG. 5A may also apply to FIG. 5B.

In some embodiments, Node A may perform the method 520. Block 521 includes: generating a bytecode of a blockchain contract, wherein the bytecode comprises one or more indicators, and the one or more indicators comprise a first indicator indicating a virtual machine type for executing the blockchain contract. Block 522 includes: transmitting the bytecode of the blockchain contract to a blockchain node for the blockchain node to trigger a virtual machine of the virtual machine type associated with the first indicator to execute the blockchain contract. In some embodiments, the one or more indicators further comprise a second indicator indicating a version of the virtual machine for executing the blockchain contract; and transmitting the bytecode of the blockchain contract to the blockchain node for the blockchain node to trigger the virtual machine of the virtual machine type associated with the first indicator to execute the blockchain contract comprises transmitting the bytecode of the blockchain contract to the blockchain node for the blockchain node to trigger the virtual machine of the virtual machine type associated with the first indicator and the second indicator to execute the blockchain contract.

Node A may include or otherwise have access to a compiler to compile the source code. In one embodiment, generating the bytecode of the blockchain contract comprises: compiling source code of the blockchain contract to obtain the bytecode of the blockchain, the source code comprising the one or more indicators. In another embodiment, generating the bytecode of the blockchain contract comprises: compiling raw source code for executing the blockchain contract to obtain a raw bytecode for executing the blockchain contract; and adding the one or more indicators to the raw bytecode to obtain the bytecode of the blockchain contract.

In some embodiments, executing a blockchain contract may include deploying, invoking, or performing another operation on the blockchain contract. In one embodiment, transmitting the bytecode of the blockchain contract to the blockchain node for the blockchain node to trigger the virtual machine of the virtual machine type associated with the first indicator to execute the blockchain contract comprises: transmitting the bytecode of the blockchain contract to the blockchain node for the blockchain node to trigger the virtual machine of the virtual machine type associated with the first indicator to deploy the blockchain contract on a corresponding blockchain, the deployed blockchain contract being associated with the virtual machine type. In another embodiment, transmitting the bytecode of the blockchain contract to the blockchain node for the blockchain node to trigger the virtual machine of the virtual machine type associated with the first indicator to execute the blockchain contract further comprises: transmitting the bytecode of the blockchain contract to the blockchain node for the blockchain node to trigger the virtual machine of the virtual machine type associated with the first indicator to invoke the deployed blockchain contract.

Figure 6A:
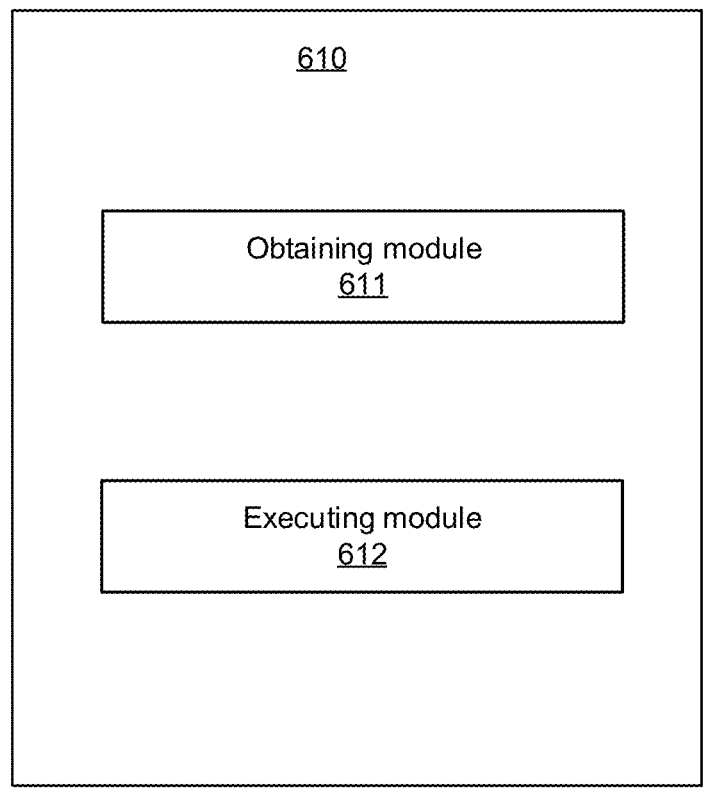
FIG. 6A illustrates a block diagram of an apparatus for executing blockchain contracts, in accordance with some embodiments.

FIG. 6A illustrates a block diagram of a system 610 for executing blockchain contracts, in accordance with some embodiments. The system 610 (e.g., a computer system) may be an example of an implementation of Node 1, Node 2, Node 3, . . . , or Node i described above or a similar device, or a combination of any of the nodes and an additional device (e.g., Node A). For example, the method 510 may be implemented by the system 610. The system 610 may comprise one or more processors and one or more non-transitory computer-readable storage media (e.g., one or more memories) coupled to the one or more processors and configured with instructions executable by the one or more processors to cause the system or device (e.g., the processor) to perform the methods and operations described above, e.g., the method 510. The system 610 may comprise various units/modules corresponding to the instructions (e.g., software instructions).

In some embodiments, the system 610 may be referred to as an apparatus for executing blockchain contracts. The apparatus may comprise an obtaining module 611 for obtaining a bytecode of a blockchain contract, wherein the bytecode comprises one or more indicators, and the one or more indicators comprise a first indicator indicating a virtual machine type for executing the blockchain contract; and an executing module 612 for executing the blockchain contract using a virtual machine of the virtual machine type associated with the first indicator.

Figure 6B:
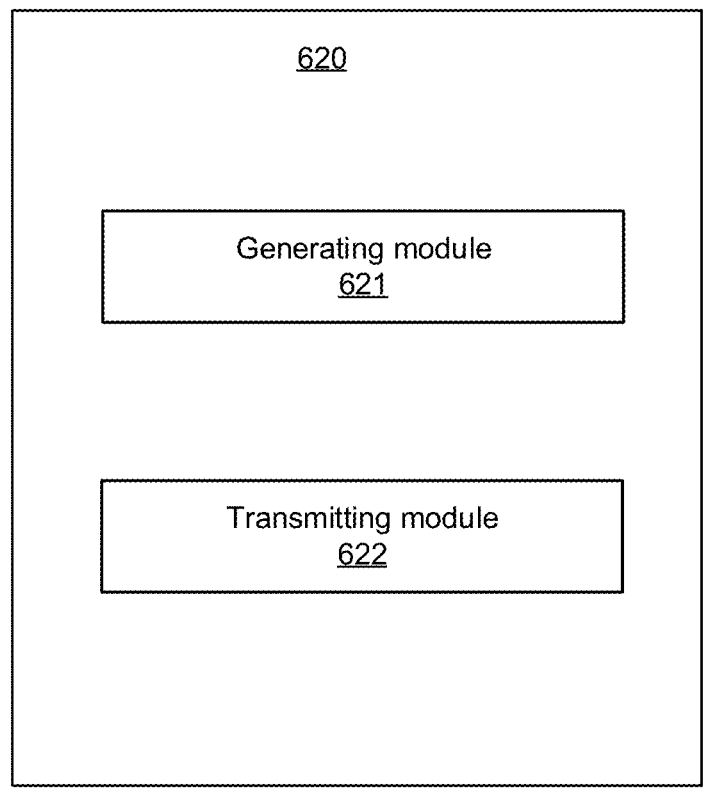
FIG. 6B illustrates a block diagram of another apparatus for executing blockchain contracts, in accordance with some embodiments.

FIG. 6B illustrates a block diagram of a system 620 for executing blockchain contracts, in accordance with some embodiments. The system 620 (e.g., a computer system) may be an example of an implementation of Node A, Node B, or a similar device, or a combination of any of the nodes and an additional device (e.g., Node 1, Node 2). For example, the method 520 may be implemented by the system 620. The system 620 may comprise one or more processors and one or more non-transitory computer-readable storage media (e.g., one or more memories) coupled to the one or more processors and configured with instructions executable by the one or more processors to cause the system or device (e.g., the processor) to perform the methods and operations described above, e.g., the method 520. The system 620 may comprise various units/modules corresponding to the instructions (e.g., software instructions).

In some embodiments, the system 620 may be referred to as an apparatus for executing blockchain contracts. The apparatus may comprise a generating module 621 for generating a bytecode of a blockchain contract, wherein the bytecode comprises one or more indicators, and the one or more indicators comprise a first indicator indicating a virtual machine type for executing the blockchain contract; and a transmitting module 622 for transmitting the bytecode of the blockchain contract to a blockchain node for the blockchain node to trigger a virtual machine of the virtual machine type associated with the first indicator to execute the blockchain contract.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
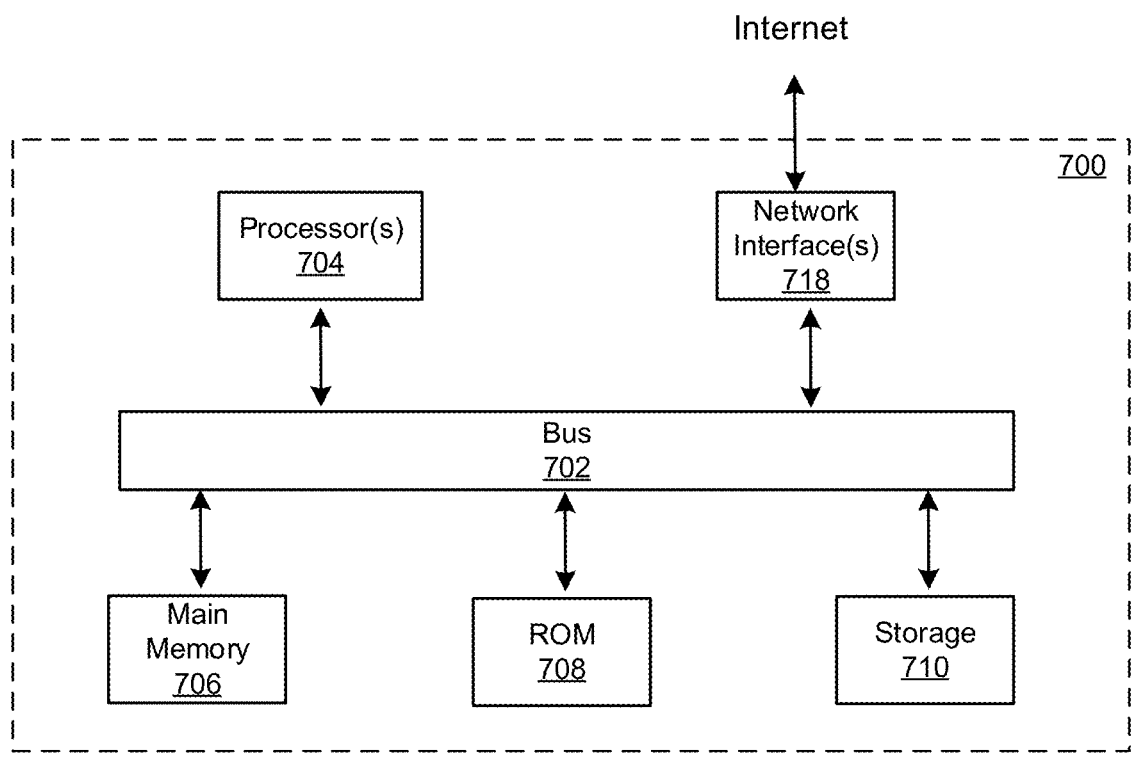
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the method 510 or 520 for executing blockchain contracts). The system 700 may be implemented in any of the systems described herein (e.g., the system 610 or 620 for executing blockchain contracts). The system 700 may be implemented in any of the nodes described herein and configured to perform corresponding steps for executing blockchain contracts. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented method for executing blockchain contracts, comprising:
  obtaining a bytecode of a blockchain contract, wherein:
    the bytecode comprises a plurality of indicators,
    the plurality of indicators comprise a first indicator indicating a virtual machine type for executing the blockchain contract and a second indicator indicating a virtual machine version for executing the blockchain contract,
    the first indicator corresponds to a first byte of the bytecode of the blockchain contract,
    the second indicator corresponds to a second byte of the bytecode of the blockchain contract, and
    a third to an $n^{th}$ byte of the bytecode of the blockchain contract correspond to code for executing the blockchain contract, n being a natural number no less than three, and the first to the $n^{th}$ byte of the bytecode of the blockchain contract specifying an application binary interface (ABI) format; and
  executing the blockchain contract using a virtual machine of the virtual machine type associated with the first indicator and of the virtual machine version associated with the second indicator.

2. The method of claim 1, wherein obtaining the bytecode of the blockchain contract comprises:
  obtaining from a client device the bytecode of the blockchain contract, wherein the bytecode is compiled from source code of the blockchain contract, and the source code comprises the plurality of indicators.

3. The method of claim 1, wherein obtaining the bytecode of the blockchain contract comprises:

obtaining from a client device source code of the blockchain contract, the source code comprising the plurality of indicators; and compiling the source code to obtain the bytecode of the blockchain contract.

4. The method of claim 1, wherein obtaining the bytecode of the blockchain contract comprises:

obtaining from a client device a raw bytecode for executing the blockchain contract, wherein the raw bytecode is compiled from raw source code for executing the blockchain contract; and adding the plurality of indicators to the raw bytecode to obtain the bytecode of the blockchain contract.

5. The method of claim 1, wherein obtaining the bytecode of the blockchain contract comprises:

obtaining from a client device raw source code for executing the blockchain contract;

compiling the raw source code to obtain a raw bytecode; and adding the plurality of indicators to the raw bytecode to obtain the bytecode of the blockchain contract.

6. The method of claim 1, wherein executing the blockchain contract using the virtual machine of the virtual machine type associated with the first indicator comprises:

triggering the virtual machine of the virtual machine type associated with the first indicator to deploy the blockchain contract on a corresponding blockchain, the deployed blockchain contract being associated with the virtual machine type.

7. The method of claim 6, wherein executing the blockchain contract using the virtual machine of the virtual machine type associated with the first indicator further comprises:

triggering the virtual machine of the virtual machine type associated with the first indicator to invoke the deployed blockchain contract.

8. The method of claim 1, wherein:

the virtual machine type for executing the blockchain contract comprises: a GNU compiler collection (GCC) virtual machine for executing blockchain contracts written in c++ programming language, a java virtual machine (JVM) for executing blockchain contracts written in java programming language, an Ethereum virtual machine (EVM) for executing blockchain contracts written in solidity programming language, or a python virtual machine (PVM) for executing blockchain contracts written in python programming language.

9. A system for executing blockchain contracts, comprising one or more processors and one or more non-transitory computer-readable memories coupled to the one or more processors and configured with instructions executable by the one or more processors to cause the system to perform operations comprising:

obtaining a bytecode of a blockchain contract, wherein:
the bytecode comprises a plurality of indicators,
the plurality of indicators comprise a first indicator indicating a virtual machine type for executing the blockchain contract and a second indicator indicating a virtual machine version for executing the blockchain contract,
the first indicator corresponds to a first byte of the bytecode of the blockchain contract,
the second indicator corresponds to a second byte of the bytecode of the blockchain contract, and
a third to an $n^{th}$ byte of the bytecode of the blockchain contract correspond to code for executing the blockchain contract, n being a natural number no less than three, and the first to the $n^{th}$ byte of the bytecode of the blockchain contract specifying an application binary interface (ABI) format; and executing the blockchain contract using a virtual machine of the virtual machine type associated with the first indicator and of the virtual machine version associated with the second indicator.

10. The system of claim 9, wherein obtaining the bytecode of the blockchain contract comprises:

obtaining from a client device the bytecode of the blockchain contract, wherein the bytecode is compiled from source code of the blockchain contract, and the source code comprises the plurality of indicators.

11. The system of claim 9, wherein obtaining the bytecode of the blockchain contract comprises:

obtaining from a client device a raw bytecode for executing the blockchain contract, wherein the raw bytecode is compiled from raw source code for executing the blockchain contract; and adding the plurality of indicators to the raw bytecode to obtain the bytecode of the blockchain contract.

12. The system of claim 9, wherein executing the blockchain contract using the virtual machine of the virtual machine type associated with the first indicator comprises:

triggering the virtual machine of the virtual machine type associated with the first indicator to deploy the blockchain contract on a corresponding blockchain, the deployed blockchain contract being associated with the virtual machine type.

13. The system of claim 9, wherein obtaining the bytecode of the blockchain contract comprises:

obtaining from a client device source code of the blockchain contract, the source code comprising the plurality of indicators; and compiling the source code to obtain the bytecode of the blockchain contract.

14. The system of claim 9, wherein obtaining the bytecode of the blockchain contract comprises:

obtaining from a client device raw source code for executing the blockchain contract;

compiling the raw source code to obtain a raw bytecode; and adding the plurality of indicators to the raw bytecode to obtain the bytecode of the blockchain contract.

15. A non-transitory computer-readable storage medium for executing blockchain contracts, the storage medium coupled to the one or more processors and configured with instructions executable by the one or more processors to cause the one or more processors to perform operations comprising:

obtaining a bytecode of a blockchain contract, wherein:
the bytecode comprises a plurality of indicators, and
the plurality of indicators comprise a first indicator indicating a virtual machine type for executing the blockchain contract and a second indicator indicating a virtual machine version for executing the blockchain contract,
the first indicator corresponds to a first byte of the bytecode of the blockchain contract,
the second indicator corresponds to a second byte of the bytecode of the blockchain contract, and
a third to an $n^{th}$ byte of the bytecode of the blockchain contract correspond to code for executing the blockchain contract, n being a natural number no less than three, and the first to the $n^{th}$ byte of the bytecode of the blockchain contract specifying an application binary interface (ABI) format; and executing the blockchain contract using a virtual machine of the virtual machine type associated with the first indicator and of the virtual machine version associated with the second indicator.

16. The storage medium of claim 15, wherein obtaining the bytecode of the blockchain contract comprises:

obtaining from a client device the bytecode of the blockchain contract, wherein the bytecode is compiled from source code of the blockchain contract, and the source code comprises the plurality of indicators.

17. The storage medium of claim 15, wherein obtaining the bytecode of the blockchain contract comprises:

obtaining from a client device a raw bytecode for executing the blockchain contract, wherein the raw bytecode is compiled from raw source code for executing the blockchain contract; and adding the plurality of indicators to the raw bytecode to obtain the bytecode of the blockchain contract.

18. The storage medium of claim 15, wherein: executing the blockchain contract using the virtual machine of the virtual machine type associated with the first indicator comprises:

triggering the virtual machine of the virtual machine type associated with the first indicator to deploy the blockchain contract on a corresponding blockchain, the deployed blockchain contract being associated with the virtual machine type.

19. The storage medium of claim 15, wherein executing the blockchain contract using the virtual machine of the virtual machine type associated with the first indicator further comprises:

triggering the virtual machine of the virtual machine type associated with the first indicator to invoke the deployed blockchain contract.

20. The storage medium of claim 15, wherein:

the virtual machine type for executing the blockchain contract comprises: a GNU compiler collection (GCC) virtual machine for executing blockchain contracts written in c++ programming language, a java virtual machine (JVM) for executing blockchain contracts written in java programming language, an Ethereum virtual machine (EVM) for executing blockchain contracts written in solidity programming language, or a python virtual machine (PVM) for executing blockchain contracts written in python programming language.

* * * * *